United States Patent
Di Lisa et al.

(10) Patent No.: US 12,071,987 B2
(45) Date of Patent: Aug. 27, 2024

(54) SYSTEM AND METHOD FOR OPERATING TWO OR MORE ACTUATORS

(71) Applicant: DANA ITALIA S.R.L., Arco (IT)

(72) Inventors: Alessandro Di Lisa, Arco (IT); Mario Gelmini, Arco (IT); Claudio Angeloni, Arco (IT); Fabio Gunsch, Arco (IT)

(73) Assignee: DANA ITALIA S.R.L., Arco (IT)

( * ) Notice: Subject to any disclaimer, the term of this patent is extended or adjusted under 35 U.S.C. 154(b) by 233 days.

(21) Appl. No.: 17/663,813

(22) Filed: May 17, 2022

(65) Prior Publication Data

US 2023/0070513 A1 Mar. 9, 2023

Related U.S. Application Data

(60) Provisional application No. 63/261,055, filed on Sep. 9, 2021.

(51) Int. Cl.
*F16D 48/06* (2006.01)
*F16D 48/02* (2006.01)

(52) U.S. Cl.
CPC ......... *F16D 48/062* (2013.01); *F16D 48/066* (2013.01); *F16D 2048/0221* (2013.01); *F16D 2048/0266* (2013.01); *F16D 2500/10412* (2013.01); *F16D 2500/3022* (2013.01); *F16D 2500/3024* (2013.01); *F16D 2500/70418* (2013.01)

(58) Field of Classification Search
CPC ...... F16D 48/066; F16D 48/062; F16D 48/02; F16D 48/0206; F16D 2048/0221; F16D 2048/0266; F16D 2500/10412; F16D 2500/3022; F16D 2500/3024; F16D 2500/70418; F16D 2500/1024
See application file for complete search history.

(56) References Cited

U.S. PATENT DOCUMENTS

| | | | |
|---|---|---|---|
| 6,175,484 B1 | 1/2001 | Caruthers et al. | |
| 6,591,814 B2 | 7/2003 | McCoy et al. | |
| 6,609,369 B2 | 8/2003 | Koehler et al. | |
| 7,373,234 B1 * | 5/2008 | Hwang | F16H 61/0251 701/68 |
| 9,322,354 B2 | 4/2016 | Nishida et al. | |
| 9,611,797 B2 | 4/2017 | Viele | |
| 9,702,313 B2 | 7/2017 | Viele | |
| 2021/0262535 A1 * | 8/2021 | Unterfrauner | F16H 61/0276 |

FOREIGN PATENT DOCUMENTS

EP 3148078 A1 3/2017

* cited by examiner

*Primary Examiner* — Timothy Hannon
(74) *Attorney, Agent, or Firm* — McCoy Russell LLP

(57) ABSTRACT

Methods and systems for operating a plurality of electrical loads are described. In one example, the systems include electrical circuits for operating solenoid valves of a transmission that may be operated to simultaneously control two or more clutches for engaging and disengaging transmission gears. The systems and method may reduce hardware costs.

20 Claims, 7 Drawing Sheets

SYSTEM AND METHOD FOR OPERATING TWO OR MORE ACTUATORS

CROSS REFERENCE TO RELATED APPLICATION

The present application claims priority to U.S. Provisional Application No. 63/261,055, entitled "SYSTEM AND METHOD FOR OPERATING TWO OR MORE ACTUATORS", and filed on Sep. 9, 2021. The entire contents of the above-listed application are hereby incorporated by reference for all purposes.

TECHNICAL FIELD

The present disclosure relates to a system and method for operating two or more electrical devices simultaneously.

BACKGROUND AND SUMMARY

A transmission may include one or more clutches that allow gears of the transmission to be shifted. The clutches may be actuated via an electro-mechanical actuator. The electro-mechanical actuator may receive an electrical current and a valve of the electro-mechanical actuator may open or close responsive to the level of electrical current that is provided to the electro-mechanical actuator. Hydraulic fluid may flow from the electro-mechanical actuator to a clutch of the transmission when the electro-mechanical actuator is at least partially open. The pressure and volume of hydraulic fluid entering the transmission clutch may be adjusted via adjusting operation of the electro-mechanical actuator. The pressure and volume of hydraulic fluid that is applied to the clutch controls an amount of torque that the clutch may transfer.

One electro-mechanical actuator may be provided for each clutch so that the clutches may be individually controlled. Electrical current that is delivered to the electro-mechanical actuator may be adjusted via a high side electrically operated device or a low side electrically operated device. A high side electrically operated device may provide desired control of the electro-mechanical actuator during nominal conditions. However, the high side electrically operated device may not be able to influence operation of the electro-mechanical actuator in a desirable way if an electrical source is inadvertently applied to the high side (e.g., pin or terminal that may be selectively coupled to a higher voltage of an electrical source) of the electro-mechanical actuator. Likewise, a low side electrically operated device may provide desired control of the electro-mechanical actuator during nominal conditions. Nevertheless, the low side electrically operated device may not be able to influence operation of the electro-mechanical actuator in a desirable way if ground or a lower potential is inadvertently applied to the low side (e.g., pin or terminal that may be selectively coupled to a lower voltage of an electrical source) of the electro-mechanical actuator.

To address at least a portion of the abovementioned issues, the inventors have developed an electrical circuit, comprising: a single high side current control device; two or more low side switching devices electrically coupled in parallel; two or more electrical loads electrically coupled in parallel to the high side current control device and the plurality of low side switching devices; and a controller including executable instructions stored in non-transitory memory to switch a first of the two or more low side switching devices at a first frequency and a first duty cycle, and instructions to switch a second of the two or more low side switching devices at the first frequency and a second duty cycle.

By applying a circuit that includes a single high side current control device and two or more low side switches, it may be possible to control electrical currents that flow individually to two or more electrical loads when electrical potential is unintentionally applied to terminals of the one or more of the two or more electrical loads. In addition, since the circuit includes only a single or sole high side electric current control device, the expense of multiple current control devices may be avoided, thereby reducing system cost. Consequently, two or more electrical loads may be controlled individually using fewer high side current control devices than the actual total number of electrical devices being controlled.

The system and method may provide several advantages. Specifically, the system and methods described herein may reduce an actual total number of electrical devices used to control a plurality of electrical loads, thereby reducing system cost. In addition, the system and methods described herein may provide a desired level of control over the plurality of electrical loads. Further, the system and methods described herein may reduce electrical device losses and a circuit size foot print or area.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
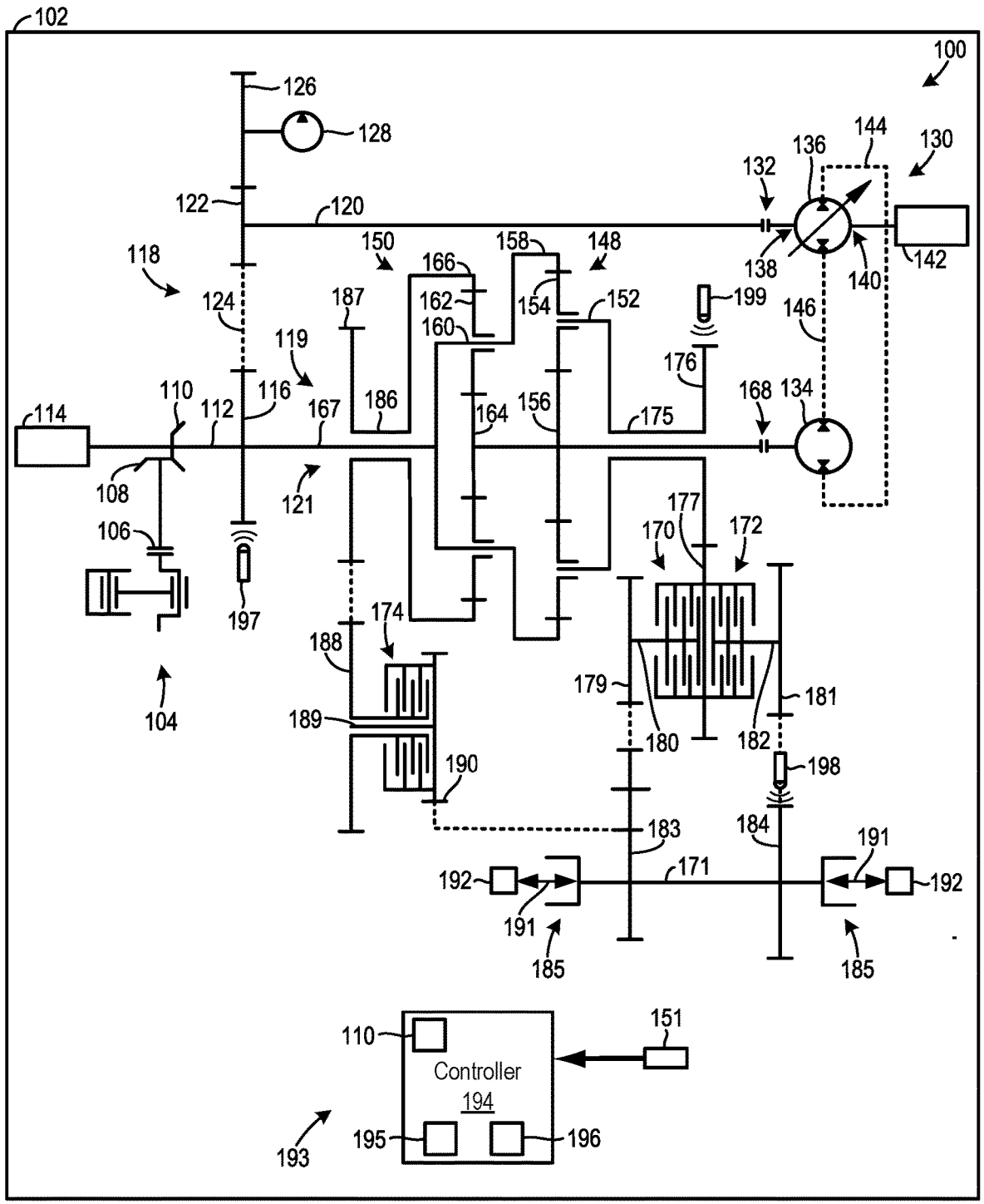
FIG. 1 is a schematic representation of a vehicle with a hydromechanical transmission.
Figure 2A:
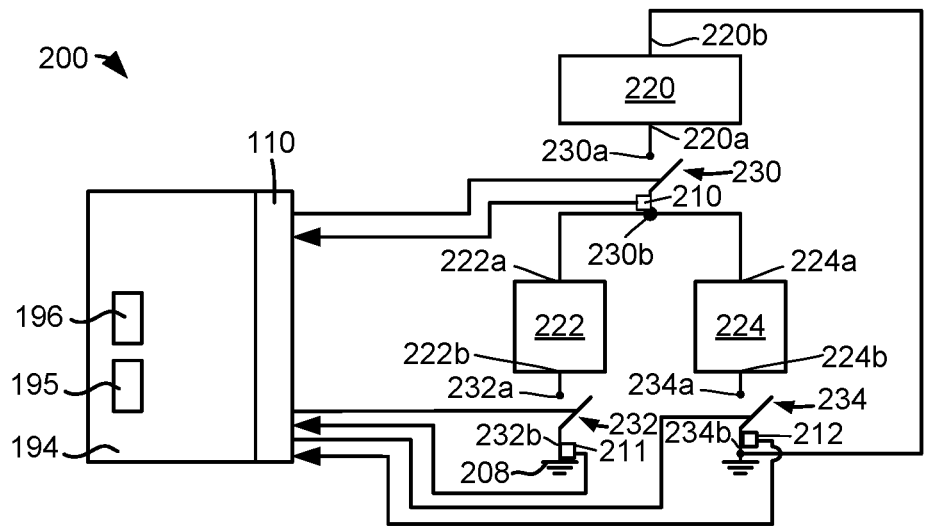
FIGS. 2A and 2B are non-limiting examples of systems and electrical circuits for operating one or more solenoid valves for shifting gears of a transmission.
Figure 2B:
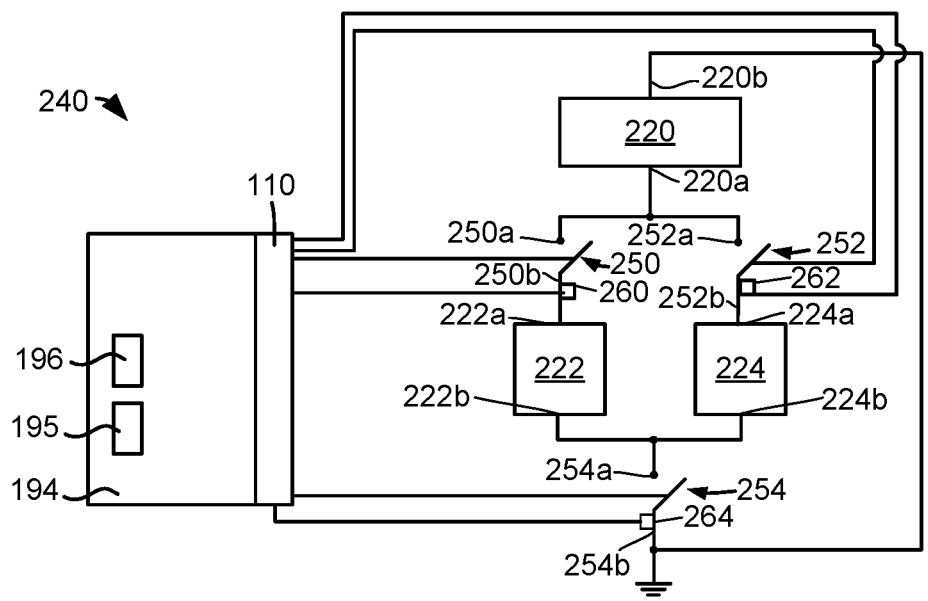
Figure 3:
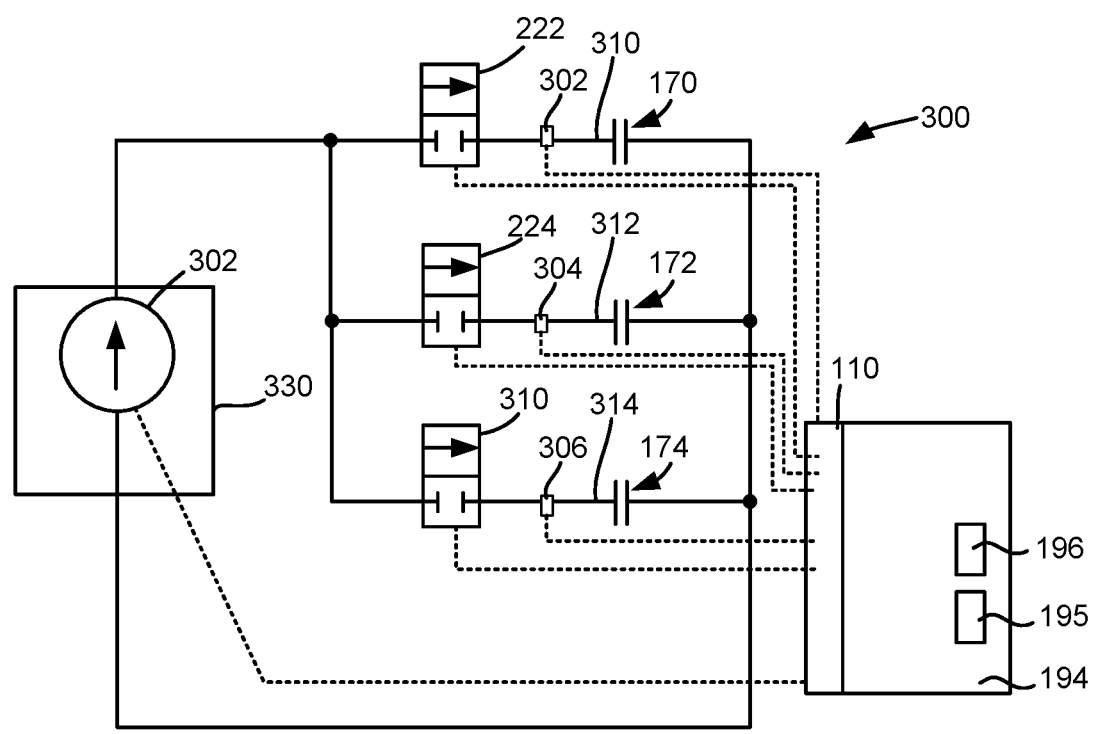
FIG. 3 is a non-limiting example of a hydraulic circuit for supplying a fluid to operate the hydromechanical transmission's clutches.

Systems that include one or more of the electrical circuits shown in FIGS. 2A and 2B may be operated to control shifting of a transmission. The transmission may be of the type shown in FIG. 1, or alternatively, the transmission may be another type that may be electrically shifted. The transmission may include hydraulically operated clutches and a hydraulic pump in a hydraulic circuit as shown in FIG. 3. The system and electrical circuit may be operated according to the sequence shown in FIG. 4. Alternatively, the system may be operated according to the sequence shown in FIG. 5. The system and method may operate two clutches together so as to provide smoother shifting. For example, two clutches that activate and deactivate two gears may be stroked in anticipation that one of the clutches will be applied a short time in the future. By stroking both of the two clutches together before a gear is selected to be engaged, the transmission may be engaged into either a first gear or a second gear once a gear is selected without having to wait to stroke either of the two clutches. As such, an amount of time to engage the selected gear may be reduced. The system including the circuitry shown in FIGS. 1-3 provides for such operation. In addition, in some examples, the system may provide closed-loop controlled according to pressures of a fluid that may be applied to open and/or close clutches in the system as indicated in the block diagram of FIG. 6. The method of FIG. 7 may be applied in the system of FIGS. 1-3 to provide the operating sequences shown in FIGS. 4 and 5.

FIG. 1 shows a schematic depiction of a transmission system 100 (e.g., a hydromechanical variable transmission) in a vehicle 102 or other suitable machine platform. In one example, the vehicle may be an off-highway vehicle, although the transmission may be deployed in on-highway vehicles, in other examples. An off-highway vehicle may be a vehicle whose size and/or maximum speed precludes the vehicle from being operated on highways for extended durations. For example, the vehicle's width may be greater than a highway lane and/or the vehicle top speed may be below the highways maximum allowable speed. Industries and their corresponding operating environments in which the vehicle may be deployed include forestry, mining, agriculture, etc. In either case, the vehicle may be designed with auxiliary system driven via hydraulic and/or mechanical power take-offs (PTOs).

The transmission system 100 may function as an infinitely variable transmission (IVT) where the transmission's gear ratio is controlled continuously from a negative maximum speed to a positive maximum speed with an infinite number of ratio points. In this way, the transmission can achieve a comparatively high level of adaptability and efficiency when compared to transmission which operate in discrete ratios. Further, in one use-case example, the transmission may be configured to operate in an environmental temperature range from −40° C.-80° C. In such an example, a sump, in a transmission lubrication system, may operate in a range between −40° C.-100° C. However, the transmission may be designed for a variety of operating temperature ranges. Further, in certain examples, the transmission system may be designed to operate on a longitudinal slope up to 35 degrees and a lateral inclination of 25 degrees. Although the longitudinal slope and/or lateral inclination threshold may be adjusted (e.g., increased or decreased) to suit different end-use design goals.

The transmission system 100 may have asymmetric maximum output speeds for forward and reverse direction (e.g., reverse drive speed may offer approximately 56% of the forward drive speed). This forward-reverse speed asymmetry may enable the transmission to achieve a desired breadth of speed ranges. However, other suitable output speed variations have been contemplated, such as symmetric output speeds in the forward and reverse directions, which may however, increase system complexity through the use of an additional clutch.

The transmission system 100 may include or receive power from a motive power source 104. The power source 104 may include an internal combustion engine, electric motor (e.g., electric motor-generator), combinations thereof, and the like. In one use-case example, the power source 104 may generate greater than 80 kilowatts (kW) of power (e.g., 100-115 kW). To elaborate, the power source may be operated in the range between 900-2100 revolutions per minute (RPM) with a targeted range between 1200-1600 RPM, in some instances. Further, in some examples, the engine idle speed may be approximately 650 RPM. However, numerous suitable transmission operating and idle speed ranges have been envisioned.

A power source disconnect clutch 106 may be further provided in the transmission The disconnect clutch 106 is configured to couple and decouple the power source 104 from the transmission. The disconnect clutch 106, as well as the other disconnect clutches described herein, may be dog clutches, in one example, or friction clutches, in other examples. Gears 108, 110, such as bevel gears, may be used to rotationally couple the power source 104 to an input shaft 112. As described herein, a gear may be a mechanical component which rotates and includes teeth that are profiled to mesh with teeth in one or more corresponding gears to form a mechanical connection that allows rotational energy transfer therethrough.

A mechanical PTO 114 may be coupled to the input shaft 112. The mechanical PTO 114 may drive an auxiliary system such as a pump (e.g., a hydraulic pump, a pneumatic pump, and the like), a winch, a boom, a bed raising assembly, etc.). To accomplish the power transfer to auxiliary components, the PTO may include an interface, shaft(s), housing, and the like. However, in other examples, the PTO and/or the disconnect clutch 106 may be omitted from the transmission system. A gear 116 may be coupled to the input shaft 112. A mechanical assembly 118 is further included in the transmission system 100. The mechanical assembly 118 may comprise the shaft 112 and/or the gear 116 as well as shaft 167, described in greater detail herein. Further, the transmission may include a shaft 120 and a gear 122 rotationally coupled to the gear 116 on the input shaft 112. Dashed line 124 and the other dashes lines depicted in FIG. 1 indicate a mechanical connection between components which facilitates rotational energy transfer therebetween.

A gear 126 meshing with gear 122 may be rotationally attached to a hydraulic PTO 128 (e.g., hydraulic pump). The hydraulic PTO 128 may be designed to deliver pressurized fluid to a vehicle system such as a water pump system, a hydraulic boom system, a hydraulic bed lift, etc. The hydraulic PTO may include a piston, a rotor, a housing, chamber(s), and the like to allow the pump to move fluid. The mechanical assembly 118 is rotationally coupled in parallel to a hydrostatic assembly 130. The coupling of the hydrostatic assembly to the mechanical assembly enables the transmission to achieve power split functionality in which power may synchronously flow through either path to additively combine or recirculate power through the system. This power split arrangement allows the transmission's power flow to be highly adaptable to increase efficiency over a wide range of operating conditions. Thus, the transmission may be a full power split transmission, in one example.

The mechanical assembly 118 may include multiple mechanical paths that are coupled in parallel to the hydrostatic assembly. To elaborate, the shaft 167 may serve as a junction for a first mechanical path (e.g., branch) 119 and a second mechanical path (e.g., branch) 121. To elaborate, the first mechanical path 119 may provide rotational energy transfer capabilities from an interface of the hydrostatic assembly 130 to a ring gear 158 of a first planetary gear set 148, during certain operating conditions. Additionally, the second mechanical path 121 may provide rotational energy transfer capabilities from the interface of the hydrostatic assembly 130 to a carrier 160 of a second planetary gear set 150.

A disconnect clutch 132 may be arranged between the hydrostatic assembly 130 and the shaft 120. The disconnect clutch 132 is configured to rotationally couple and decouple the mechanical assembly 118 from the hydrostatic assembly 130. To elaborate, the disconnect clutch may be a dog clutch, in one example.

The hydrostatic assembly 130 includes a hydraulic motor 134 and a pump 136. Further, the hydraulic pump 136 may include a first mechanical interface 138 and a second mechanical interface 140. The first mechanical interface 138 may be rotationally coupled to the disconnect clutch 132 and the second mechanical interface 140 may be rotationally coupled to another mechanical PTO 142. Again, the mechanical PTO may be used to drive an auxiliary vehicle system such as an air compressor, a mechanical arm or boom, an auger, etc. In this way, the transmission may be adapted for a variety of end-use operating environments. Specifically, providing multiple PTOs, in the arrangement depicted in FIG. 1, enables the transmission system to meet end-use design goals in a variety of different types of vehicles, if wanted. As such, the system's applicability is expanded and the customer appeal of the transmission is increased.

The hydraulic pump 136 may be a variable displacement bi-directional pump, in one example. Specifically, the pump may be an axial piston pump, in one instance. To elaborate, the axial piston pump may include a squash plate that interacts with pistons and cylinders to alter the pump's displacement via a change in swivel angle, in one specific example. However, other suitable types of variable displacement bi-directional pumps have been contemplated.

The hydraulic motor 134 may be a fixed displacement bi-directional motor (e.g., fixed bent axis motor). The fixed bent axis motor is relatively compact when compared to variable displacement motors. The system can therefore achieve greater space efficiency and pose less space constraints on other systems in the vehicle, if desired. However, alternate types of pumps and/or motors may be used, if motor adjustability is favored at the expense of compactness, for instance.

Hydraulic lines 144, 146 are attached to hydraulic interfaces in each of the motor and pump to enable the hydrostatic assembly to provide additive and power circulation functionality with regard to the mechanical branches arranged in parallel with the hydrostatic assembly 130. For example, in an additive power mode, power from both the hydrostatic and mechanical assemblies is combined at one of the planetary gear sets and delivered to the transmission output. In a power split mode, power is recirculated through the hydrostatic assembly. Therefore, the hydraulic pump 136 and the motor 134 may be operated to flow power to the sun gears of either planetary assembly from the hydraulic motor. Conversely, the pump and the motor may be operated to flow power back to the gear set and the mechanical branches.

The transmission system 100 further includes the first planetary gear set 148 and the second planetary gear set 150. The first planetary gear set 148 may comprise a carrier 152 on which planet gears 154 rotate. The planet gears 154 may mesh with a sun gear 156 and the ring gear 158. Likewise, the second planetary gear set 150 may include the carrier 160, planet gears 162, a sun gear 164, and a ring gear 166. Therefore, the second planetary gear set 150 may again be a simple planetary gear. Further, bearings arranged between the planet gears and the carrier in each planetary arrangement may facilitate rotation thereof. The sun gears and/or shafts to which they are attached may further have bearings coupled thereto. The bearings may be roller bearings (e.g., needle roller bearings), ball bearings, or other suitable types of bearings that enable component rotation while constraining other relative motions.

The carrier 160 of the second planetary gear set 150 may be rotationally coupled to the ring gear 158 of the first planetary gear set 148. Further, the carrier 160 of the second planetary gear set 150 may be rotationally coupled to a shaft 167. The shaft 167 may extend through a central opening in an extension 186, described in greater detail herein. This rotational attachment scheme may be conceptually described as a formation of mechanical branches attached in parallel to the hydrostatic assembly 130.

As described herein a parallel attachment between components, assemblies, etc., denotes that the input and output of the two components or grouping of components are rotationally coupled to one another. This parallel arrangement allows power to recirculate through the hydrostatic assembly, during some conditions, or be additively combined from the mechanical and hydrostatic branches, during other conditions. As a result, the transmission's adaptability is increased, which allows gains in operating efficiency to be realized, when compared to purely hydrostatic transmissions.

The sun gears 156, 164 of the first and second planetary gear sets 148, 150 may be rotationally coupled (e.g., directly attached) to one another. Attaching the sun gears in this manner may enable the transmission to achieve a desired gear ratio, compactness, and efficiency.

The hydraulic motor 134 may be rotationally coupled to the sun gear 156 via another disconnect clutch 168 that is designed to rotationally connect and disconnect the motor from the planetary gear set 148. The disconnect clutch may be a dog type clutch which uses an interference fit between component for clutch engagement, in one example. However, in an alternate example, the disconnect clutch may be another suitable type of clutch, such as a friction clutch.

The transmission system 100 further includes a reverse clutch 170, a first forward drive clutch 172, and a second forward drive clutch 174. More generally, the first forward drive clutch may be referred to as a first clutch or a first forward clutch, the reverse drive clutch may be referred to as a second clutch or a reverse clutch and the second forward drive clutch may be referred to as a third clutch or a second forward clutch.

The clutches 170, 172, 174 may be friction clutches that each includes two sets of plates. The clutch plates may rotate about a common axis and are designed to engage and disengage one another to facilitate selective power transfer to downstream components. In this way, the clutches may be closed and opened to place them in engaged and disengaged states. In the disengaged state, power is not transferred through the clutch. Conversely in the engaged state, power may be transferred through the clutch during transmission operation. Further, the clutches may be hydraulically, electromagnetically, and/or pneumatically actuated as described in more detail in the description of FIGS. 2 and 3. For instance, the clutches may be adjusted via a hydraulic piston. The adjustability may be continuous, in one example, where the clutch may be transition through partially engaged states to a fully engaged state, where a relatively small amount of power loss occurs in the clutch. However, in other examples, the clutches may be discretely adjusted.

The carrier 152 may include an extension 175 with a gear 176 that meshes with a gear 177. The gear 177, in the illustrated example, is rotationally coupled to a gear 178 attached to the reverse clutch 170 and the first forward clutch 172. The reverse clutch 170 and the first forward clutch 172 are shown arranged adjacent to one another and may share a common rotational axis. Because of this proximal clutch arrangement, the system may exhibit greater compactness which poses less space constraints on adjoining vehicle systems. Alternatively, the reverse clutch may be spaced away from the first forward clutch which may, however, decrease system compactness.

A gear 179 may reside on an output shaft 180 of the reverse clutch 170. Likewise, a gear 181 may reside on an output shaft 182 of the first forward clutch 172. Both gears 179, 181 may be rotationally attached to a system output shaft 171 via gears 183, 184 respectively. In this way, both the reverse clutch and the first forward clutch deliver power to the transmission's output, during different operating conditions.

The system output shaft 171 may include one or more interfaces 185 (e.g., yokes, gears, chains, combinations thereof, etc.). The output shaft is specifically illustrated with two outputs. However, the transmission may include an alternate numbers of outputs. The gear 179 is rotationally coupled to the output shaft via meshing with gear 183. Arrows 191 depict the flow of power from the transmission system to drive axles 192 and/or other suitable downstream vehicle components or vice versa. A driveline with a shaft, joints, etc. may be used to carry out the power transfer between the transmission and the axles. It will be understood that the drive axles may include drive wheels.

The ring gear 166 of the second planetary gear set 150 may include the extension 186 with a gear 187 position thereon. The gear 187 may be rotationally attached to a gear 188 in the second forward clutch 174, as indicated via a dashed line. The gear 188 may be coupled to a first set of plates in the clutch 174. A second set of plates in the clutch may be attached to an output shaft 189 and a gear 190. The gear 190 may be rotationally coupled to the gear 183, as indicated by a dashed line. Due to the arrangement of the clutches and the planetary gear sets, the transmission system 100 achieves a higher efficiency and enhanced drivability, comfort, and productivity than previous hydromechanical transmissions.

The transmission system 100 may additionally include a lubrication system which may comprise a sump, as previously discussed. This lubrication system may further include conventional components for lubricating the gears and/or the clutches such as pumps, conduits, valves, and the like.

A control system 193 with a controller 194 may further be incorporated in the transmission system 100. The controller 194 includes a processor 195 and memory 196. The memory 196 may hold instructions stored therein that when executed by the processor cause the controller 194 to perform the various methods, control strategies, diagnostic techniques, etc., described herein. The processor 195 may include a microprocessor unit and/or other types of circuits. The memory 196 may include known data storage mediums such as random access memory, read only memory, keep alive memory, combinations thereof, etc. The memory 196 may include non-transitory memory. Controller 194 may also include input and output circuitry 110 (e.g., digital inputs, digital outputs, analog inputs, analog outputs, pulse width modulated outputs, counter/timer outputs, etc.).

The controller 194 may receive vehicle data and various signals from sensors positioned in different locations in the transmission system 100 and/or the vehicle 102. The sensors may include gear speed sensors 197, 198, 199 which detect the speed of gear 116, gear 184, and gear 176, respectively. In this way, gear speed at the input and the output of the system may be detected along with the gear speed at the output of the first planetary gear set 148. However, in other examples, the speeds of at least a portion of the gears may be modelled by the controller. Controller 194 may also receive input from pressure sensors as indicated in FIG. 3.

The controller 194 may send control signals to an actuator in the hydraulic pump 136 or an actuation system coupled to the pump to adjust the pumps output and/or direction of hydraulic fluid flow. Additionally, actuators for clutches 170, 172, 174 may receive commands (e.g., opening or closing commands) from the controller and actuators in the clutches or actuation systems coupled to the clutches may adjust the state of the clutch in response to receiving the command. For example, the clutches may be actuated via hydraulically controlled pistons and flow of hydraulic fluid to the pistons may be regulated via a solenoid or other electro-mechanical valve that is adjustable via electric current supplied to the solenoid or electro-mechanical valve, although other suitable clutch actuators have been envisioned. The other controllable components in the transmissions system include the hydraulic motor 134, the clutch 106, the clutch 132, the clutch 168, the motive power source 104, and the like. These controllable components may function similarly with regard to receiving control commands and adjusting an output and/or a state of a component responsive to receiving the command via an actuator. Additionally or alternatively, a vehicle electronic control unit (ECU) may be provided in the vehicle to control the power source (e.g., engine and/or motor). Furthermore, the control system 193 and specifically the controller 194 with the memory 196 and processor 195 may be configured to carry out the shifting methods.

The transmission system 100 may include one or more input devices 151 (e.g., an accelerator pedal, shifter, levers, buttons, combinations thereof, and the like). The input devices 151, responsive to driver input, may generate a transmission speed or torque adjustment request and a desired drive direction (a forward or reverse drive direction). Further, the transmission system may automatically switch between drive modes when demanded. For example, the operator may request a forward or reverse drive mode speed change, and the transmission may increase speed and automatically transition between the drive ranges associated with the different drive modes, when needed. Further, in one example, the operator may request reverse drive operation while the vehicle is operating in a forward drive mode. In such an example, the transmission may automatically initiate a shift (e.g., synchronous shift) between the forward and reverse drive modes. In this way, the operator may more efficiently control the vehicle, in comparison to transmissions designed for manual drive mode adjustment. However, in other examples, the system may be designed to allow the vehicle operator to manually request a mode change between the forward drive ranges. It will further be appreciated, that the power source may be controlled in tandem with the transmission. For example, when a speed adjustment requested is received by the controller, the power source's output speed may be correspondingly increased.

Referring now to FIG. 2A, an example of an electrical circuit for adjusting operation of transmission clutches is shown. However, in other examples, the circuit of FIG. 2A may drive and operate other electrically operated devices (e.g., resistive devices, inductive devices, lighting devices, etc.). Thus, it should be appreciated that alternative versions of the circuit shown in FIG. 2A are anticipated. In addition, FIG. 2A shows two electrical loads 222 and 224 being driven via a single or sole high side electric current control device 230 and a plurality of switching devices 232 and 234; however, in other examples, three or more electrical loads may be arranged in parallel with the two electrical loads 222 and 224. Further, the three or more electrical loads may be electrically coupled to the sole high side electric current control device 230 and additional switching devices in a way that is similar to the way electrical load 222 is electrically coupled to sole high side electric current control device 230 and switch 232.

The electrical circuit 200 of FIG. 2A includes controller 194 as previously discussed with regard to FIG. 1. In addition, circuit 200 includes a power supply 220 having a first terminal 220a and a second terminal 220b. First terminal 220a (e.g., high voltage terminal, which also may be referred to as a high side of power supply 220) outputs a voltage that is greater or higher than a voltage of second terminal 220b (e.g., low voltage terminal, which also may be referred to as a low side of power supply 220). In some examples, second terminal 220b may be electrically coupled to ground. The first terminal 220a of power supply 220 may be directly coupled to a first terminal or pin 230a of electric current control device 230. A second terminal or pin 230b of high side electric current control device 230 (e.g., a switching device) may be electrically coupled to electrically operated devices (e.g., electro-mechanical actuators, resistive devices, capacitive devices, and/or inductive devices) 222 and 224. Electric current control device 230 may be referred to as a high side electric current control device since it controls electric current flow from a side of the electrically operated devices 222 and 244 that is closest to the high voltage terminal 220a of power supply 220. In one example, high side electric current control device may be a transistor, such as a field effect transistor (FET), metal oxide field effect transistor (MOSFET), or other known transistor that may operate as a current control device. Electric current control device 230 may include an integral current sensor 210. Alternatively, current sensor 210 may be placed between electric current control device 230 and electrically operated devices 222 and 224. An average amount of current that flows through the high side electric current control device may be adjusted via adjusting a frequency and a duty cycle (e.g., a ratio of an amount of time a control signal is on or high compared to an amount of time that the control signal is off or low during a period of the control signal—a duty cycle of a signal that is 5 volts for 0.4 seconds and 0 volts for 0.6 seconds and that has a period of one second is 40% or 0.4/1=0.4) of a signal that commands the high side electric current control device. Controller 194 may send a command signal to operate high side electric current control device 230.

Electrically operated devices 222 and 224 are electrically coupled in parallel. In this example, electrically operated devices 222 and 224 may be configured as solenoid operated valves that include a hydraulic control valve as shown in FIG. 300 to regulate flow of hydraulic fluid (e.g., oil) to transmission clutches (e.g., 170, 172, and 174). However, electrically operated devices 224 and 224 may be configured as alternative types of electrically operated devices (e.g., piezo-electric devices, etc.) in other examples. Electrically operated device 222 includes a high side 222a and a low side 222b. Likewise, electrically operated device 224 includes a high side 224a and a low side 224b. High sides 222a and 224a are directly electrically coupled to the low side 230b of high side electric current control device 230. A low side 222b of electrically operated device 222 is electrically coupled to a high side 232a of low side switching device 232. Switching device 232 may include an integral current sensor 211. Alternatively, current sensor 211 may be placed between switching device 232 and electrically operated ground 208. Similarly, a low side 224b of electrically operated device 224 is electrically coupled to a high side 234a of low side switching device 234. Low side switching device 234 may include an integral current sensor 212. Alternatively, current sensor 212 may be placed between low side switching device 234 and ground 208.

Electrical circuit 200 also includes low side switching devices 232 and 234. Low side switching device 232 includes a high side 232a that is directly electrically coupled to a low side 222b of electrically operated device 222. Low side switching device 232 also includes a low side 232b that is directly electrically coupled to ground and/or a low side 220b of power supply 220. Similarly, low side switching device 234 includes a high side 234a that is directly electrically coupled to a low side 224b of electrically operated device 224. Low side switching device 234 also includes a low side 234b that is directly electrically coupled to ground and/or a low side 220b of power supply 220. Controller 194 may generate and send command signals to operate low side switching devices 232 and 234.

Thus, in this example, it may be observed that a single or sole high side electric current control device 230 exists on a high side of electrically operated devices or loads 222 and 224. Conversely, there is a low side switch for each of the electrically operated devices 222 and 224. The high side electric current control device 230 may operate to control current flow to all of the electrically operated devices 222 and 224 while the switching devices may individually control current flow through electrically operated devices 222 and 224. The high side electric current control device 230 allows electrically operated devices 222 and 224 to be deactivated if ground is unintentionally applied to the low sides of electrically operated devices 222 and 224. Conversely, switching devices 232 and 234 allow electrically operated devices 222 and 224 to be deactivated if power is unintentionally applied to high sides of electrically operated devices 222 and 224. In addition, system cost may be reduced while system functionality and performance are preserved by applying a sole high side electric current control device 230 in place of a plurality of current control devices.

Referring now to FIG. 2B, an alternative electrical circuit 240 for adjusting operation of transmission clutches is shown. Circuit 240 includes many of the same components as shown in FIG. 2A. Components of circuit 240 that are the same as components shown in FIG. 2A are numbered in a same way. For example, electrically operated device 222 in FIG. 2A is the same as electrically operated device 222 shown in FIG. 2A. Therefore, for the sake of brevity, the descriptions of devices in FIG. 2B that are the same as devices in FIG. 2A are omitted.

The electrical circuit 240 of FIG. 2B includes controller 194 as previously discussed with regard to FIG. 1. In addition, circuit 240 includes a power supply 220 having a first terminal 220a and a second terminal 220b. The first terminal 220a of power supply 220 may be directly electrically coupled (e.g., no intervening electrical devices and not including conductors) to a first terminal or pin 250a of electric current control device 250. First terminal 220a of power supply 220 may also be directly electrically coupled to first terminal or pin 252a of electric current control device 252. A second terminal or pin 250b of high side electric current control device 250 may be electrically coupled to electrically operated device (e.g., electro-mechanical actuators, resistive devices, capacitive devices, and/or inductive devices) 222. Electric current control device 250 may include an integral current sensor 260. Alternatively, current sensor 260 may be placed between electric current control device 250 and electrically operated device 222. Similarly, a second terminal or pin 252b of high side electric current control device 252 may be electrically coupled to electrically operated device (e.g., electro-mechanical actuators, resistive devices, capacitive devices, and/or inductive devices) 224. Electric current control device 252 may include an integral current sensor 262. Alternatively, current sensor 262 may be placed between electric current control device 252 and electrically operated device 224. Electric current control devices 250 and 252 may be referred to as a high side electric current control devices since they control electric current flow to sides of the electrically operated devices 222 and 244 that are closest to the high voltage terminal 220a of power supply 220. In one example, high side electric current control devices 250 and 252 may be transistors, such as field effect transistors (FET), metal oxide field effect transistors (MOSFET), or other known transistors that may operate as a current control device. An average amount of current that flows through the high side electric current control devices may be adjusted via adjusting a frequency and a duty cycle (e.g., a ratio of an amount of time a control signal is on or high compared to an amount of time that the control signal is off or low during a period of the control signal—a duty cycle of a signal that is 5 volts for 0.4 seconds and 0 volts for 0.6 seconds and that has a period of one second is 40% or 0.4/1=0.4) of a signal that commands the high side electric current control device. Controller 194 may send command signals to operate high side electric current control devices 250 and 252.

Electrically operated devices 222 and 224 are electrically coupled in parallel. Electrically operated device 222 includes a high side 222a and a low side 222b. Likewise, electrically operated device 224 includes a high side 224a and a low side 224b. High side 222a is directly electrically coupled to the low side 250b of high side electric current control device 250. Similarly, high side 224a is directly electrically coupled to the low side 252b of high side electric current control device 252. A low side 222b of electrically operated device 222 is electrically coupled to a high side 254a of switching device 254. Similarly, a low side 224b of electrically operated device 224 is electrically coupled to the high side 254a of low side switching device 254.

In this example, electrical circuit 240 includes only one low side switching device 254. Low side switching device 254 includes a high side 254a that is directly electrically coupled to a low side 222b of electrically operated device 222 and to a low side 224b of electrically operated device 224. Low side switching device 254 also includes a low side 254b that is directly electrically coupled to ground and/or a low side 220b of power supply 220. Controller 194 may generate and send command signals to operate low side switching devices 254.

Thus, in this example, it may be observed that two high side electric current control devices 250 and 252 exists on a high side of electrically operated devices or loads 222 and 224. Conversely, there is only one low side switch for each of the electrically operated devices 222 and 224.

The current sensors on the high sides of electrically operated devices 222 and 224 may be useful to control current flowing through both electrically operated devices 222 and 224. Current sensors on low sides of electrically operated devices 222 and 224 may be useful to control current individually through the electrically operated devices 222 and 224.

Referring now to FIG. 3, a schematic of a hydraulic system 300 for operating clutches of a transmission is shown. The transmission may be of the type shown in FIG. 1. Hydraulic lines or conduits are shown as solid lines and electrical connections are indicated by dashed lines.

Hydraulic system 300 includes a pump 302 for supplying pressurized hydraulic fluid to clutches 170, 172, and 174. The hydraulic system also includes solenoid valves 222, 224, and 310. Hydraulic system also includes clutches 170, 172, and 174 as well as fluid pressure sensors 302, 304, and 306.

Pump 302 may be electrically driven or it may be driven mechanically via transmission system 100. Pump 302 may supply fluid from sump or reservoir 330 to clutches 170, 172, and 174. The valves 222 and 224 are included as part of electrically operated devices 222 and 224 shown in FIG. 2A, but the valves of the electrically operated devices are shown to illustrate the hydraulic operation of the solenoid operated valves. Valve 310 may be similar to valves 222 and 224.

In hydraulic system 300, pump supplies hydraulic fluid to valves 222, 224, and 310. Controller 194 may selectively supply electrical current to valves 222, 224, and 310. The electrical current may fully close, partially open, or fully open valves 222, 224, and 310. Flow of hydraulic fluid to clutches 170, 172, and 174 may be regulated by the positions of valves 222, 224, and 310. For example, if valve 222 is partially opened, clutch 170 may be stroked such that the plates of clutch 170 are moved to a position just before torque may begin to be transferred through clutch 170. If valve 222 is opened further, the torque carrying capacity of clutch 170 may increase. Valves 224 and 310 operate with clutches 172 and 174 in a similar way.

Pressures of hydraulic fluid in conduits 310, 312, and 314 may be determined via pressure sensors 302, 304, and 306. The pressure information may be applied to control valves 222, 224, and 310 in a closed-loop fashion as discussed with regard to FIG. 6. The pressures in conduits 310, 312, and 314 may be determined via controller 194 and output of sensors 302, 304, and 306.

The system of FIGS. 1-3 provides for an electrical circuit, comprising: a single high side current control device; two or more low side switching devices electrically coupled in parallel; two or more electrical loads electrically coupled in parallel to the high side current control device and the plurality of low side switching devices; and a controller including executable instructions stored in non-transitory memory that cause the controller to switch a first of the two or more low side switching devices from a first state (off) to a second state (on) at a first frequency and a first duty cycle, and instructions to switch a second of the two or more low side switching devices from a first state to a second state at the first frequency and a second duty cycle. The electrical circuit includes where the high side electric current control device is comprised of one or more transistors, and further comprising at least one high side current sensor and at least one low side current sensor. The electrical circuit includes where the low side switching devices are comprised of one or more transistors. The electrical circuit includes where the first frequency is a function of a pressure of a fluid supplied to transmission clutches. The electrical circuit includes where an on time of the first of the two or more low side switching devices does not overlap with an on time of the second of the two or more low side switching devices while the first of the two or more low side switching devices and the second of the two or more low side switching devices are switched at the first frequency. The electrical circuit further comprises additional instructions to adjust the first duty cycle and the second duty cycle as a function of a requested average electrical current flow rate through the two or more electrical loads. The electrical circuit includes where the two or more electrical loads are solenoid valves that regulate flow of a fluid to two or more transmission clutches.

The system of FIGS. 1-3 also provides for an electrical circuit, comprising: two or more electric loads; a current control device coupled to and positioned between the two or more electric loads and a high voltage terminal of an electric power source; two or more switching devices electrically coupled in parallel and positioned between the two or more electric loads and a low voltage terminal of the electric power source; and a controller including executable instructions stored in non-transitory memory to cause the controller to adjust electric current flowing through the current control device to a first amount when a first of the two or more switching devices is activated, and instructions to adjust electric current flowing through the current control device to a second amount when a second of the two or more switching devices is activated, the first amount different from the second amount. The electrical circuit includes wherein adjusting electric current flowing through the current control device includes adjusting electric current in response to a requested pressure of a fluid flowing through a first solenoid valve. The electrical circuit includes wherein adjusting electric current flowing through the current control device includes adjusting electric current in response to a requested pressure of a fluid flowing through a second solenoid valve. The electrical circuit includes wherein the first and second solenoid valves control a fluid supplied to a first clutch and a second clutch. The electrical circuit further comprises at least two pressure sensors and additional instructions to adjust the electric current flowing through the current control device in response to output of the at least two pressure sensors.

Figure 4:
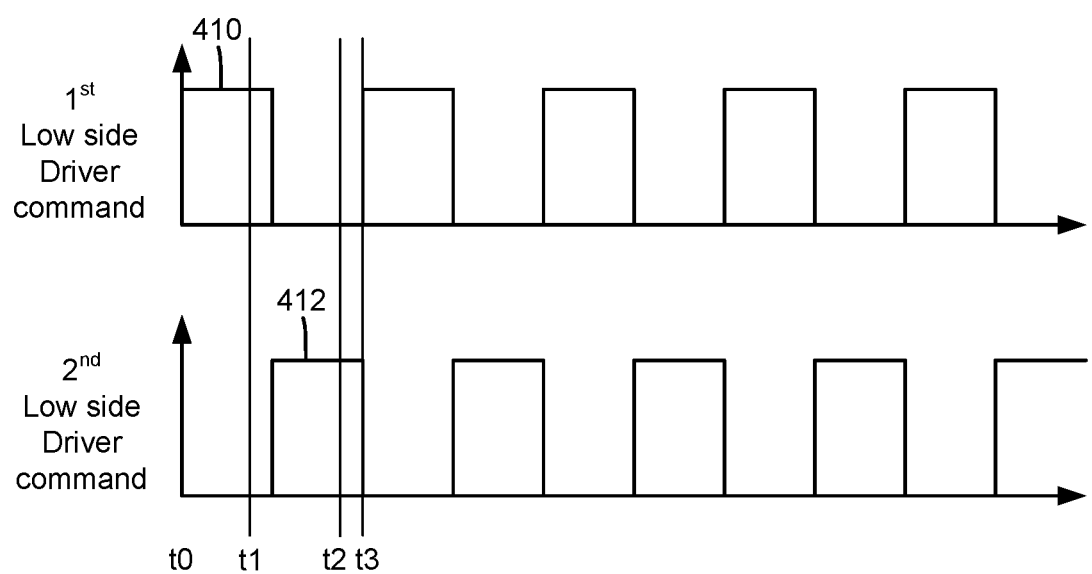
FIG. 4 shows a prophetic example of a first way to operate the system and electrical circuit shown in FIG. 2A.
Figure 7:
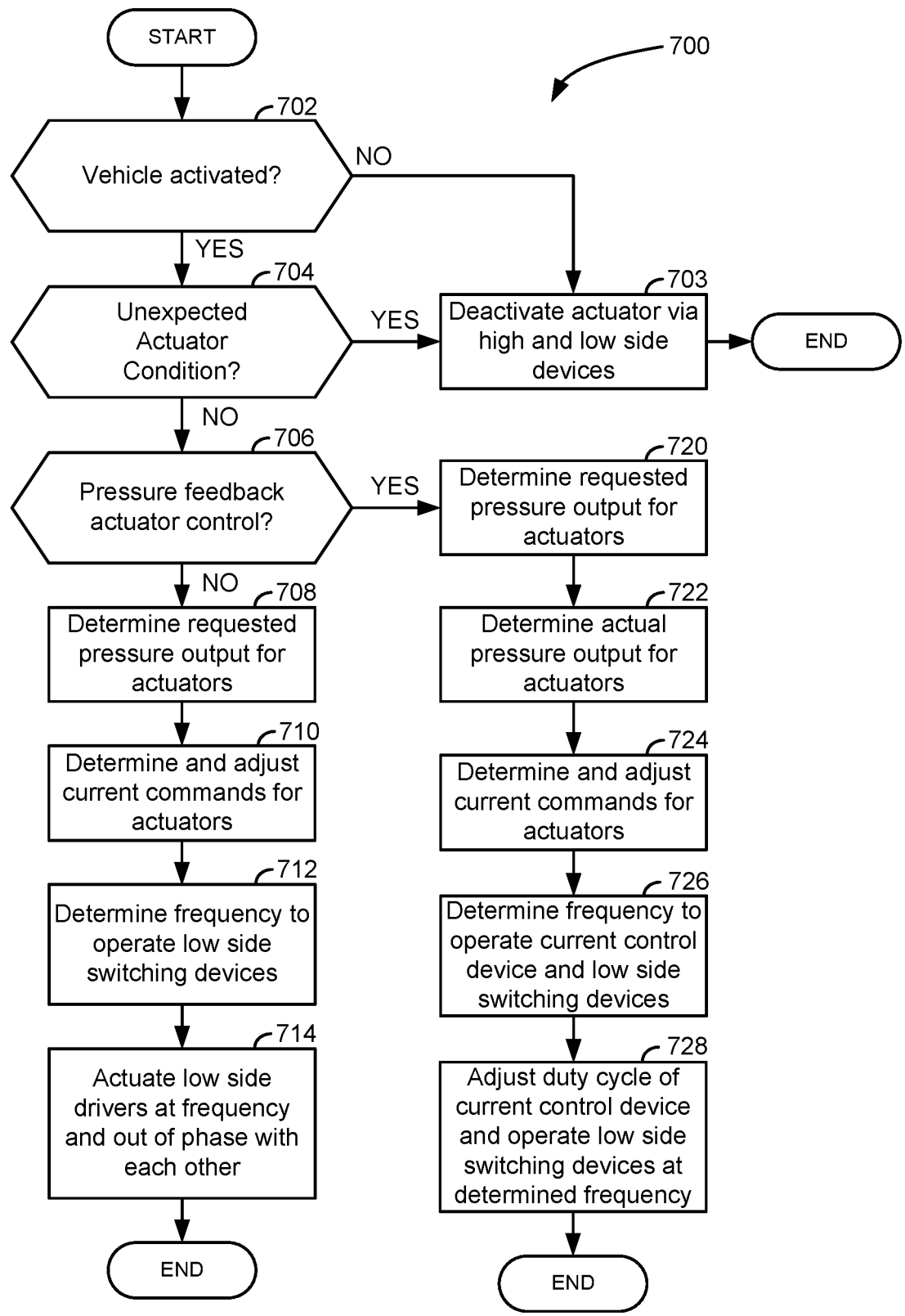
FIG. 7 shows a flowchart of a method for operating the system and circuitry shown in FIG. 2A.

Referring now to FIG. 4, a sequence according to the method of FIG. 7 to operate two electrically operated devices is shown. The sequence of FIG. 4 may be provided via the system of FIGS. 1-3 in cooperation with the method of FIG. 7. The plots shown in FIG. 4 are time aligned and they occur at a same time.

The first plot from the top of FIG. 4 is a plot of a command signal that is delivered to a first low side switching device (e.g., 232) when the high side electric current control device (e.g., 230), if present, is activated and allowing power to reach the electrically operated device (e.g., 222). The vertical axis represents a voltage level of the command signal and the voltage level increases in the direction of the vertical axis. The low side switching device is commanded on to allow electric current flow through the low side switching device when trace 410 is at a higher level near the vertical axis arrow. The low side switching device is commanded off to prevent electric current flow through the low side switching device when trace 410 is at a lower level near the horizontal axis. The horizontal axis represents time and time increases from the left side of the figure to the right side of the figure. Trace 410 represents the low side switching device command signal.

The second plot from the top of FIG. 4 is a plot of a command signal that is delivered to a second low side switching device (e.g., 234) when the high side electric current control device (e.g., 230), if present, is activated and allowing power to reach the electrically operated device (e.g., 224). The vertical axis represents a voltage level of the command signal and the voltage level increases in the direction of the vertical axis. The low side switching device is commanded on to allow electric current flow through the low side switching device when trace 412 is at a higher level near the vertical axis arrow. The low side switching device is commanded off to prevent electric current flow through the low side switching device when trace 412 is at a lower level near the horizontal axis. The horizontal axis represents time and time increases from the left side of the figure to the right side of the figure. Trace 412 represents the low side switching device command signal.

The first low side switching device and the second low side switching device are operated at a frequency that has a period that is indicated from time t0 to time t3. The first low side switching device is turned on with a 50% duty cycle and the first low side switching device is not turned on when the second low side switching device is turned on. The second low side switching device is also turned on with a 50% duty cycle. Thus, the first low side switching device is commanded off when the second low side switching device is commanded on. The frequency at which the first low side switching device and the second low side switching device are activated may be a function of pressures in conduits between the clutches and the actuator valves (e.g., conduits 310, 312, and 314 in FIG. 3). In particular, the frequency may be a function of an amount of pressure ripple or variation observed in the conduits. The frequency may be empirically determined and stored in a table or function that may be referenced to determine a desired frequency for activating the first and second low side switching devices. The duty cycle at which the first and second low side switching devices are activated may be a function of a requested amount of current flowing to the valve actuators, or alternatively, the duty cycle may be a function of a requested pressure amount in conduits between the clutches and the actuator valves. For example, if it is requested to lower the first clutch's torque transferring capacity, the duty cycle applied to the first low side switching device may be reduced to the timing shown at time t1. Similarly, if it is requested to lower the second clutch's torque transferring capacity, the duty cycle applied to the second low side switching device may be reduced to the timing shown at time t2.

The first low side switching device may be activated out of phase with when the second low side switching device is activated so that electrical current that is delivered to a first valve actuator may be less or greater than electrical current that is delivered to the second valve actuator. In other words, by activating the first low side switching device at a different time than the second low side switching device, it may be possible to operate two or more electric power consumers or actuators at a common frequency, but with different electric currents, so that the two or more electric power consumers or actuators may be adjusted to different positions. Adjusting the valve actuators to different positions may help to reduce shifting times and only one high side electric current control device is used, thereby reducing system cost.

In this way, a first actuator may be adjusted to control flow of a fluid to a first clutch at a frequency while a second actuator is adjusted to control flow of fluid to a second clutch at the same frequency. In addition, the duty cycles at which the first actuator and the second actuator are actuated may be adjusted to control the average amounts of electrical current that flows to the first actuator and the second actuator.

Figure 5:
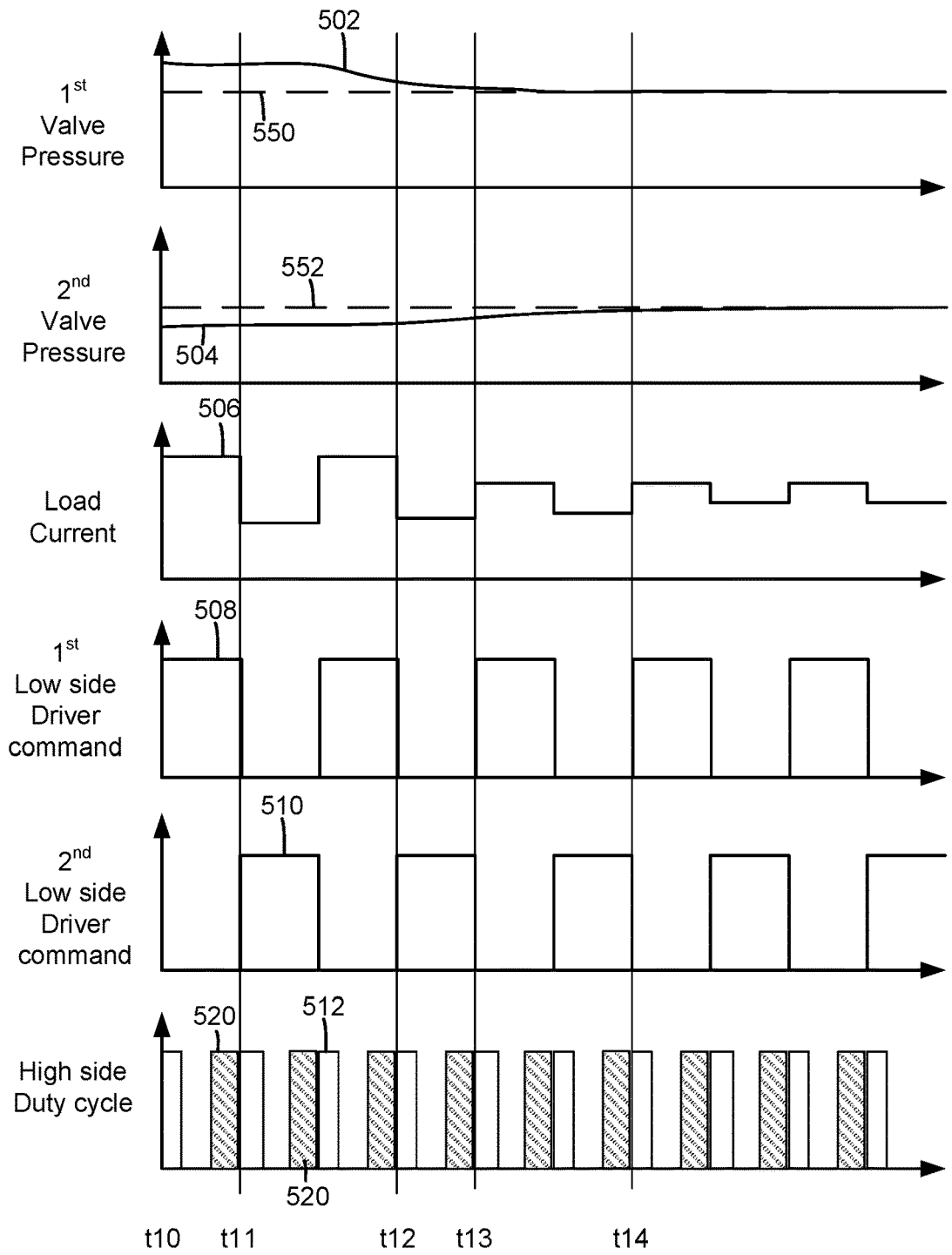
FIG. 5 shows a prophetic example of a second way to operate the system and circuit shown in FIG. 2A.

Referring now to FIG. 5, a sequence according to the method of FIG. 7 to operate two electrically operated devices is shown. The sequence of FIG. 5 may be provided via the system of FIGS. 1-3 in cooperation with the method of FIG. 7. The plots shown in FIG. 5 are time aligned and they occur at a same time.

The first plot from the top of FIG. 5 is a plot of pressure of fluid output from a first valve (e.g., 222) that is operated by a first actuator versus time. The vertical axis represents pressure and pressure increases in the direction of the vertical axis arrow. Opening the first valve via the first actuator by a larger amount may increase pressure output from the first valve. The horizontal axis represents time and time increases from the left side of the figure to the right side of the figure. Trace 502 represents the pressure of fluid that is output from the first valve and supplied to a first clutch. Line 550 represents a requested fluid pressure to be output from the first valve and supplied to the first clutch.

The second plot from the top of FIG. 5 is a plot of pressure of fluid output from a second valve (e.g., 224) that is operated by a second actuator versus time. The vertical axis represents pressure and pressure increases in the direction of the vertical axis arrow. Opening the second valve via the second actuator by a larger amount may increase pressure output from the second valve. The horizontal axis represents time and time increases from the left side of the figure to the right side of the figure. Trace 504 represents the pressure of fluid that is output from the second valve and supplied to a clutch. Line 552 represents a requested fluid pressure to be output from the second valve and supplied to the second clutch.

The third plot from the top of FIG. 5 is a plot of load current that is flowing through the high side electric current control device (e.g., 230). The vertical axis represents an average current level flowing through the high side electric current control device and the current amount increases in the direction of the vertical axis. The horizontal axis represents time and time increases from the left side of the figure to the right side of the figure. Trace 506 represents the load current amount.

The fourth plot from the top of FIG. 5 is a plot of a command signal that is delivered to a first low side switching device (e.g., 232). The vertical axis represents a voltage level of the command signal and the voltage level increases in the direction of the vertical axis. The low side switching device is commanded on to allow electric current flow through the low side switching device when trace 508 is at a higher level near the vertical axis arrow. The low side switching device is commanded off to prevent electric current flow through the low side switching device when trace 508 is at a lower level near the horizontal axis. The horizontal axis represents time and time increases from the left side of the figure to the right side of the figure. Trace 508 represents the low side switching device command signal.

The fifth plot from the top of FIG. 5 is a plot of a command signal that is delivered to a second low side switching device (e.g., 234). The vertical axis represents a voltage level of the command signal and the voltage level increases in the direction of the vertical axis. The low side switching device is commanded on to allow electric current flow through the low side switching device when trace 510 is at a higher level near the vertical axis arrow. The low side switching device is commanded off to prevent electric current flow through the low side switching device when trace 510 is at a lower level near the horizontal axis. The horizontal axis represents time and time increases from the left side of the figure to the right side of the figure. Trace 510 represents the low side switching device command signal.

The sixth plot from the top of FIG. 5 is a plot of a duty cycle that the high side electric current control device is operated at to control electric current flow through the high side electric current control device. The vertical axis represents the duty cycle that the high side electric current control device is operated at and the duty cycle value increases in the direction of the vertical axis arrow. The electric current flow through the high side electric current control device may increase as the duty cycle value increases. The horizontal axis represents time and time increases from the left side of the figure to the right side of the figure. Trace 512 represents the duty cycle of the high side electric current control device. Cross-hatched areas 520 are pause intervals in the high side electric current control device where the high side electric current control device may not be switched on or off so that the individual electric loads that are electrically coupled to the high side electric current control devices may discharge.

At time t10, the requested first valve pressure is less than the first valve pressure. Therefore, the load current higher may be higher than is desired. The load current may be decreased via decreasing a duty cycle at which the high side electric current control device operated. The first low side switching device is activated and the second low side switching device is deactivated so that all of the electrical current that flows through the high side electric current control device flows through the first low side switching device.

At time t11, the requested second valve pressure is greater than the second valve pressure. Therefore, the load current of is increased to increase the second valve pressure. The load current may be increased via increasing a duty cycle at which the high side electric current control device operated. The second low side switching device is switched to an activated state and the first low side switching device is switched to a deactivated state so that all of the electrical current that flows through the high side electric current control device flows through the second low side switching device.

At time t12, the second valve pressure is closer to the requested second valve pressure. Therefore, the load current through the high side electric current control device is decreased a small amount relative to the load current at time t11 to reduce a rate that the second pressure is converging to the second requested pressure. The load current may be decreased via decreasing a duty cycle at which the high side electric current control device is operated. The second low side switching device is switched to an activated state and the first low side switching device is switched to a deactivated state so that all of the electrical current that flows through the high side electric current control device flows through the second low side switching device.

At time t13, the first valve pressure is closer to the requested first valve pressure. Therefore, the load current through the high side electric current control device is increased further relative to the load current just before time t12 to change the rate that the first pressure converges to the requested first pressure. The load current may be increased from the load current just before time t12 via increasing a duty cycle at which the high side electric current control device operated relative to the duty cycle that was applied at time t12. The first low side switching device is switched to an activated state and the second low side switching device is switched to a deactivated state so that all of the electrical current that flows through the high side electric current control device flows through the first low side switching device.

At time t14, the first valve pressure is at the requested first valve pressure. Therefore, the load current through the high side electric current control device is not adjusted further. Likewise, the second valve pressure is at the requested second valve pressure so the load current for the second valve is not adjusted further. The first low side switching device is switched to an activated state and the second low side switching device is switched to a deactivated state so that all of the electrical current that flows through the high side electric current control device flows through the first low side switching device.

In this way, a high side electric current control device may be modulated to provide different levels of current to the first actuator and the second actuator. In addition, the duty cycles at which the high side electric current control device may be adjusted to control the average amounts of electrical current that flows to the first actuator and the second actuator may be adjusted. By adjusting load current via the both the high side electric current control device and the low side switching devices, it may be possible to provide greater differences between electrical load currents that may be delivered to the first and second electrical loads.

Figure 6:
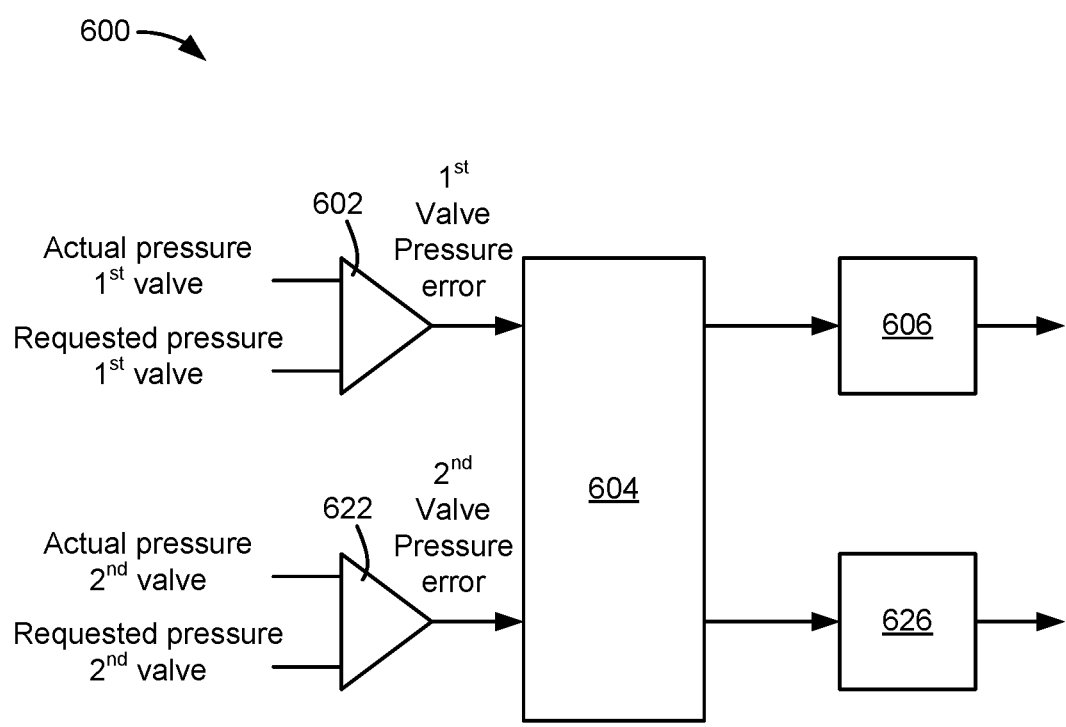
FIG. 6 shows a block diagram of a way to operate the system and circuit shown in FIG. 2A.

Referring now to FIG. 6, a block diagram showing a way that the system of FIGS. 1-3 may be closed-loop controlled. Block diagram 600 includes a first group of blocks 602-606 for regulating pressure that may be applied to a first clutch of a transmission so that the first clutch may be opened or closed.

An actual first clutch pressure and a requested first clutch pressure are input to block 602. Block 602 determines a difference between the requested first clutch pressure and the actual first clutch pressure, which may be referred to as a first clutch pressure error. The operation of block 602 may be described via the following equation: CL1_err=PCL1R−PCL1 where CL1_err is the pressure error for the first clutch pressure, PCL1R is the requested pressure for the first clutch and PCL1 is the actual pressure of the first clutch.

The first clutch pressure error is output from block 602 and input to block 604. In block 604 a controller generates a first valve actuator electrical current adjustment. In one example, a proportional adjustment may be made that is based on the first clutch pressure error. For example, the electrical current adjustment for the first clutch actuator may be expressed via the following equation: CL1_adj=Prop*CL1_err where CL1_adj is the first clutch current adjustment, Prop is the proportional amount of the adjustment, and CL1_err is the pressure error for the first clutch pressure. In other examples, block 606 may apply a proportional/integral controller or another known type of controller. Block 604 outputs a current adjustment value to block 606.

At block 606, the current adjustment value is converted into a duty cycle which is applied to the high side electric current control device. In one example, the current adjustment amount may be applied to reference a table or function that outputs a duty cycle value according to the current adjustment amount. In addition, in some examples, an open-loop duty cycle value may be determined and added to the duty cycle adjustment. The open-loop duty cycle value may be determined from a table or function that outputs a duty cycle value according to a value actuator current amount that is determined from a requested output pressure of the first valve.

Block diagram 600 also includes blocks 622 and 626 for regulating pressure that may be applied to a second clutch of a transmission so that the second clutch may be opened or closed. Blocks 622 and 626 operate similarly to blocks 602-606, except blocks 622 and 626 receive a requested second clutch pressure and an actual second clutch pressure instead of first clutch pressures. In addition, the output of block 626 is applied to adjust an actuator of a second clutch. Therefore, for the sake of brevity, the description of blocks 622 and 626 is not repeated.

Referring now to FIG. 7, a method for operating two or more electrical devices is shown. The method of FIG. 7 may be included in the system of FIG. 1-3 as executable instructions stored in non-transitory memory. Further still, portions of the method of FIG. 7 may be actions taken in the physical world by a controller.

At 702, method 700 judges if a vehicle is activated. A vehicle may be activated via a key switch, pushbutton, key fob, or other known method. If method 700 judges that the vehicle is activated, the answer is yes and method 700 proceeds to 704. Otherwise, the answer is no and method 700 proceeds to 703.

At 703, method 700 deactivates one or more electrically operated devices (e.g., electro-mechanical devices such as solenoid actuators, piezo-electric actuators, etc.) via preventing current flow through a sole high side electric current control device and two or more low side switching devices. The high side electric current control device and low side switching devices may be included in a circuit as shown in FIG. 2A. Method 700 proceeds to exit.

At 704, method 700 judges whether or not an unexpected condition is present at an electrically operated device. In one example, an unexpected condition may be a battery voltage being present at the electrically operated device or a ground potential being present at the electrically operated device. If method 700 judges that an unexpected condition is present at the electrically operated device, the answer is yes and method 700 proceeds to 703. Otherwise, the answer is no and method 700 proceed to 706.

At 706, method 700 judges if pressure feedback actuator control is to be provided. In one example, method 700 may judge that pressure feedback is to be provided if the system includes pressure sensors. If method 700 judges that pressure feedback actuator control is to be provided, the answer is yes and method 700 proceeds to 720. Otherwise, the answer is no and method 700 proceeds to 708.

At 720, method 700 determines a requested pressure output for electrically operable devices (e.g., valve actuators, etc.). In one example, there may be a plurality of electrically operable devices that are to be operated at the same time. For example, two or more actuators may supply pressurized fluid to two or more clutches so that one or more of the clutches may be stroked and/or so that one or more of the clutches may transfer a requested amount of torque or power from a power source. In some examples, two clutch actuators may be supplied with electrical currents that open valves and allows two clutches to be stroked to a position just before torque capacity of the clutches increases from zero. In other examples, one clutch actuator may be supplied with electrical current to stroke a first clutch while another clutch actuator is supplied with electrical current to fully close a second clutch. The clutch actuators may adjust positions of valves to control pressure of fluid that may be delivered to clutches. A unique fluid pressure may be applied to each clutch so that the clutches may be operated independently. Further, the fluid pressures applied to each of the clutches may be requested pressures that are based on requested torque capacities for each of the clutches, and the requested torque capacities of the clutches may be based on vehicle operating conditions, such as power source output power and vehicle speed. Additionally, the requested pressures may be based on a position of a gear selector. In one example, method 700 may reference one or more functions and/or tables that include empirically determined valve actuator output pressures. The functions and/or tables may be referenced via vehicle operating conditions, such as, but not limited to vehicle speed, gear selector position, driver demand torque, propulsive effort source power output, etc. The tables and/or functions output the requested pressures that are to be delivered to the clutches. Method 700 proceeds to 722.

At 722, method 700 determines actual output pressures of the two or more actuators. The actual output pressures may be determined from pressure sensors. Method 700 proceeds to 724.

At 724, method 700 determines and adjusts current commands for two or more electrically actuated devices (e.g., electro-mechanical actuators such as valve actuators). In one example, method 700 may determine a pressure difference between the requested pressure and the actual pressure to determine a pressure error for each electrically operated device as previously described. Each pressure error may be multiplied by a proportional gain (e.g., a scalar) to determine electrical current adjustments for each electrically operated device. In addition, an open-loop electrical current value may be determined for each electrically operated device based on the requested torque capacities of the clutches. Each electrical current adjustment may be added to its corresponding open-loop electrical current value to determine electric currents for each electrically operated device. Method 700 proceeds to 726.

At 726, method 700 determines a frequency to operate the sole high side current control device and the low side switching devices. The high side current control device and the low side switching devices are operated at a same frequency. In one example, the electrical current amounts are applied to reference one or more tables or functions of empirically determined frequency values and the tables or functions output a frequency to operate the high side current control device and the low side switching devices. The frequencies may be determined via operating the electrically operable devices and monitoring pressure output from the electrically operable devices, including ripple pressure or pressure variation in the hydraulic fluid pressure that is delivered to the two or more clutches. Frequencies that provide the requested pressures with least amounts of ripple pressure may be input into the tables or functions. Method 700 proceeds to 728 after determining the frequencies to operate the high side current control device and the low side switching devices.

At 728, method 700 adjusts a duty cycle of a signal that is applied to the sole or single high side current control device during a period during which a first of the two low side switches is closed to allow electrical current to flow through the first electrically operated device. The duty cycle may be increased to increase current flow through the first electrically operated device and the duty cycle may be decreased to decrease current flow through the first electrically operated device. The duty cycle of the signal may be based on the amount of current requested to flow through the first electrically operated device as determined at step 724. Thus, the signal that is supplied to the high side current control device may be pulse width modulated.

The first low side switching device may be operated at the frequency determined at 726, but the first low side switching device may be operated at half or less of the period of the frequency that is determined at 726 so that the second low side switching device may also be operated at the frequency determined at 726. For example, as shown in FIG. 5, the low side drivers may be operated at a same frequency with a 50% duty cycle and out of phase so that current flowing to the electrically operated devices may be individually controlled. It should be noted that duty cycles other than 50% may also be applied if desired, but on times of one low side switching device should be out of phase with on times of other low side switching devices.

Method 700 also adjusts a duty cycle of a signal that is applied to the sole or single high side current control device during a period during which a second of the two low side switches is closed to allow electrical current to flow through the second electrically operated device. The duty cycle may be increased to increase current flow through the first electrically operated device and the duty cycle may be decreased to decrease current flow through the first electrically operated device. The duty cycle of the signal may be based on the amount of current requested to flow through the second electrically operated device as determined at step 724.

The second low side switching device may also be operated at the frequency determined at 726, but the second low side switching device may be activated allowing current to flow through the second low side switching device at half or less of the period of the frequency that is determined at 726 so that the first low side switching device may also be operated at the frequency determined at 726. It should be noted that duty cycles other than 50% may also be applied if desired. Method 700 proceeds to exit.

In this way, method 700 may individually adjust electrical currents that may be supplied to two or more electrically operated devices that receive the electrical current through a sole high side electric current control device and two or more low side switching devices so that individual current control may be provided to two or more devices without having to deploy two or more high side electric current control devices.

At 708, method 700 determines a requested pressure output for electrically operable devices (e.g., valve actuators, etc.) as previously described at 720. Method 700 proceeds to 710.

At 710, method 700 determines and adjusts current commands for two or more electrically actuated devices (e.g., valve actuators). In one example, method 700 looks up a current command via referencing a table or function of empirically determined current values according to the pressures determined at 708. Values in the table or function may be determined by comparing actuator current values with measured actuator output pressures. Method 700 proceeds to 712.

At 712, method 700 determines a frequency to operate the low side switching devices. In one example, the electrical current amounts determined at 710 references one or more tables or functions of empirically determined frequency values and the tables or functions output a frequency to operate the low side switching devices. The frequencies in the table or function may be determined via operating the electrically operable devices and monitoring pressure output from the electrically operable devices, including ripple pressure or pressure variation in the hydraulic fluid pressure that is delivered to the two or more clutches. Frequencies that provide the requested pressures with least amounts of ripple pressure may be input into the tables or functions. Method 700 proceeds to 714 after determining the frequencies to operate the low side switching devices.

At 714, method 700 operates the two or more low side switching devices at the frequency determined at 712. The two or more low side switching devices are operated out of phase with each other as shown in FIG. 3 so that unique and individual currents may be provide to the two or more electrically operated devices. Further, the duty cycle of signals that operate or drive the low side switching devices may be duty cycle or pulse width modulated so as to vary average electrical current amounts that may be supplied to the two or more electrically operated devices. The sole high side electric current control device may be maintained in a closed state to allow electrical current to flow to the electrically operated devices and the two or more low side switching devices. Method 700 proceeds to exit.

In this way, amounts of electrical current that are supplied to one or more electrically operated devices may be individually and uniquely controlled. The electrical currents may be provided via a sole high side current control device and two or more low side switching devices as shown in FIG. 2A. Consequently, system hardware costs may be reduced by eliminating one or more high side current control devices.

Thus, the method of FIG. 7 provides for a method for operating an electrical circuit, comprising: switching a first switching device at a first duty cycle and at a first frequency, wherein the first switching device controls electric current flow through a first electric device; switching a second switching device at the first frequency and at a second duty cycle, wherein the second switching device controls electric current flow through a second electric device; and adjusting electric power supplied to the first electric device and the second electric device via a device that is positioned downstream of a power supply and upstream of the first electric device and the second electric device. The method includes where the first frequency is based on a pressure of a fluid that is supplied to a transmission clutch. The method includes where an on time of the first switching device does not overlap with an on time of the second switching device. The method further comprises adjusting the first duty cycle based on a requested electric current flow through the first electric device and adjusting the second duty cycle based on a requested electric current flow through the second electric device.

In some example, the method includes where the first electric device is a solenoid valve configured to supply fluid to a first clutch, and where the second electric device is a solenoid valve configured to supply fluid to a second clutch. The method includes where adjusting electric power supplied to the first electric device includes adjusting an amount of electric current suppled to the first electric device when the first switching device is commanded on, and where adjusting electric power supplied to the second electric device includes adjusting an amount of electric current suppled to the second electric device when the second switching device is commanded on. The method includes where the amount of electric current suppled to the first electric device when the first switching device is commanded on is different than the average amount of electric current suppled to the second electric device when the second switching device is commanded on, and where the first switching device is commanded on during a same period of a signal that the second switching device is commanded on. The method includes where device that is positioned downstream of the power supply and upstream of the first electric device and the second electric device is a transistor, and where the first and second switching devices are transistors.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

As used herein, the terms "approximately" and "substantially" are construed to mean plus or minus five percent of the range, unless otherwise specified.

The invention claimed is:

1. An electrical circuit, comprising:
   a single high side current control device;
   two or more low side switching devices electrically coupled in parallel;
   two or more electrical loads electrically coupled in parallel to the high side current control device and the plurality of low side switching devices; and
   a controller including executable instructions stored in non-transitory memory that cause the controller to switch a first of the two or more low side switching devices at a first frequency and a first duty cycle, and instructions to switch a second of the two or more low side switching devices at the first frequency and a second duty cycle.

2. The electrical circuit of claim 1, where the high side current control device is comprised of one or more transistors, and further comprising:
   at least one high side current sensor and at least one low side current sensor.

3. The electrical circuit of claim 2, where the low side switching devices are comprised of one or more transistors.

4. The electrical circuit of claim 1, where the first frequency is a function of a pressure of a fluid supplied to transmission clutches.

5. The electrical circuit of claim 1, where an on time of the first of the two or more low side switching devices does not overlap with an on time of the second of the two or more low side switching devices while the first of the two or more low side switching devices and the second of the two or more low side switching devices are switched at the first frequency.

6. The electrical circuit of claim 1, further comprising additional instructions to adjust the first duty cycle and the second duty cycle as a function of a requested average electrical current flow rate through the two or more electrical loads.

7. The electrical circuit of claim 1, where the two or more electrical loads are solenoid valves that regulate flow of a fluid to two or more transmission clutches.

8. A method for operating an electrical circuit, comprising:
   switching a first switching device at a first duty cycle and at a first frequency, wherein the first switching device controls electric current flow through a first electric device;
   switching a second switching device at the first frequency and at a second duty cycle, wherein the second switching device controls electric current flow through a second electric device; and
   adjusting electric power supplied to the first electric device and the second electric device via a device that is positioned downstream of a power supply and upstream of the first electric device and the second electric device.

9. The method of claim 8, where the first frequency is based on a pressure of a fluid that is supplied to a transmission clutch.

10. The method of claim 8, where an on time of the first switching device does not overlap with an on time of the second switching device.

11. The method of claim 8, further comprising adjusting the first duty cycle based on a requested electric current flow through the first electric device and adjusting the second duty cycle based on a requested electric current flow through the second electric device.

12. The method of claim 8, where the first electric device is a solenoid valve configured to supply fluid to a first clutch, and where the second electric device is a solenoid valve configured to supply fluid to a second clutch.

13. The method of claim 8, where adjusting electric power supplied to the first electric device includes adjusting an amount of electric current supplied to the first electric device when the first switching device is commanded on, and where adjusting electric power supplied to the second electric device includes adjusting an amount of electric current supplied to the second electric device when the second switching device is commanded on.

14. The method of claim 13, where the amount of electric current supplied to the first electric device when the first switching device is commanded on is different than the average amount of electric current supplied to the second electric device when the second switching device is commanded on, and where the first switching device is commanded on during a same period of a signal that the second switching device is commanded on.

15. The method of claim 8, where device that is positioned downstream of the power supply and upstream of the first electric device and the second electric device is a transistor, and where the first and second switching devices are transistors.

16. An electrical circuit, comprising:
   two or more electric loads;
   two current control devices coupled to and positioned between the two or more electric loads and a high voltage terminal of an electric power source;
   one sole switching devices electrically coupled in parallel and positioned between the two or more electric loads and a low voltage terminal of the electric power source; and
   a controller including executable instructions stored in non-transitory memory to cause the controller to adjust electric current flowing through at least one of the two current control devices to a first amount when a first of the two or more switching devices is activated, and instructions to adjust electric current flowing through the at least one of the two current control devices to a second amount when a second of the two or more switching devices is activated, the first amount different from the second amount.

17. The electrical circuit of claim 16, wherein adjusting electric current flowing through the at least one of the two current control device includes adjusting electric current in response to a requested pressure of a fluid flowing through a first solenoid valve.

18. The electrical circuit of claim 17, wherein adjusting electric current flowing through the at least one of the two current control devices includes adjusting electric current in response to a requested pressure of a fluid flowing through a second solenoid valve.

19. The electrical circuit of claim 18, wherein the first and second solenoid valves control a fluid supplied to a first clutch and a second clutch.

20. The electrical circuit of claim 16, further comprising at least two pressure sensors and additional instructions to adjust the electric current flowing through the at least one of the two current control devices in response to output of the at least two pressure sensors.

* * * * *